July 24, 1956 R. G. EMRICK 2,755,685
MULTIPLE TOOL OPERATING HEAD
Filed July 31, 1953
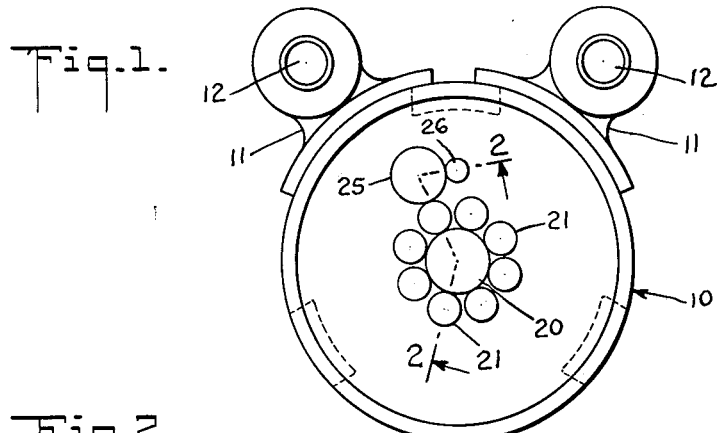
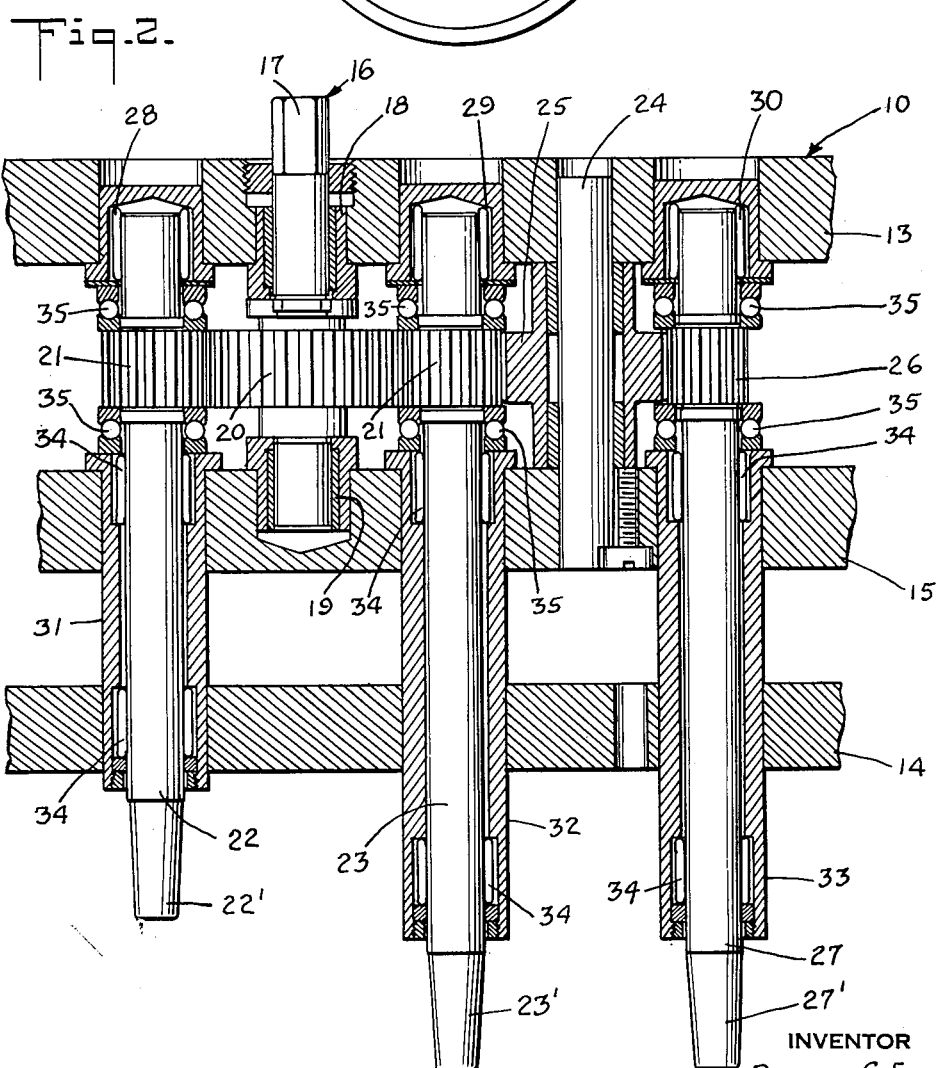
INVENTOR
ROBERT G. EMRICK
BY
ATTORNEY

United States Patent Office 2,755,685
Patented July 24, 1956

2,755,685

MULTIPLE TOOL OPERATING HEAD

Robert G. Emrick, Manhasset, N. Y.; Agnes G. Emrick, administratrix of said Robert G. Emrick, deceased Application July 31, 1953, Serial No. 371,493

7 Claims. (Cl. 74—665)

This invention relates to what are commonly referred to as multiple heads, wherein a plurality of tools such, for example, as drills or taps, are simultaneously actuated in drilling or tapping a predetermined arrangement of holes in a workpiece.

More particularly, the invention deals with a head of the character described having means for reinforcing the tool spindles in the head in maintaining greater efficiency and operation of the head.

The novel features of the invention will be best understood from the following description, when taken together with the accompanying drawing, in which certain embodiments of the invention are disclosed and, in which, the separate parts are designated by suitable reference characters in each of the views and, in which:

Fig. 1 is a diagrammatical plan view of the head, indicating arrangement of spindles and drives, one with respect to the other; and Fig. 2 is a section on the broken line 2—2 of Fig. 1, showing the various spindles and drives in structural relationship to each other.

In Fig. 1 of the drawing, 10 represents a casing having two bearing blocks 11 at one side portion thereof, the bearing blocks being apertured as seen at 12 for mounting on guide rods, not shown, in movement of the head toward and from the workpiece in machines employed for operating heads of the kind under consideration. These machines are well known in the art, and for this reason no specific showing is made thereof.

Considering Fig. 2 of the drawing, it will appear that the casing 10 is made up of a top plate 13 and a bottom plate 14, these plates forming two casing parts joined at their peripheral edges, and at 15 I have shown an intermediate bearing plate to give stability to the various tool spindles at later described. The plate 15 is supported between the two casing plates 13 and 14 at the peripheral edges thereof in order to maintain the spaced relationship which is shown in Fig. 2. At 16 I have shown the drive shaft for coupling with the drive of a machine, the shaft having a protruding angular coupling end 17, and is arranged in a suitable bearing 18 in the plate 13, and also has a bearing support as at 19 in the plate 15.

At 20 is shown the main drive gear, this gear being diagrammatically indicated at 20 in Fig. 1 of the drawing. The gear 20 meshes with a plurality of pinions, diagrammatically shown at 21 in Fig. 1, and two of these pinions are illustrated in Fig. 2 of the drawing. One of the pinions is mounted on a short tool operating spindle 22, shown at the left of Fig. 2, whereas another of the pinions 21 is mounted on a longer tool spindle 23, and the different pinions may have spindles similar to 22 and 23 in their arrangement about the gear 20, as diagrammatically seen in Fig. 1 of the drawing. At 24 I have shown an idler shaft having bearing supports in the plates 13 and 15, as clearly noted, and rotatable on the shaft 24 is an idler gear 25, the latter being diagrammatically shown in Fig. 1 of the drawing. Meshing with the gear 25 is a pinion 26 diagrammatically seen in Fig. 1, the pinion 26 being fixed to another tool operating spindle 27, as clearly noted in Fig. 2 of the drawing.

The spindles 22 and 23 have bearing supports in the plate 13, as seen at 28 and 29 respectively, and a similar bearing support is provided for the spindle 27, as seen at 30.

Mounted in the plates 14 and 15 are long bearing sleeves or tubes 31, 32 and 33 for the spindles 22, 23 and 27 respectively, it being understood that similar sleeves or tubes are employed on the spindles actuated by the other gears 21 of the arrangement diagrammatically shown in Fig. 1, eight of these gears being shown. At this time it might be well to point out that the particular arrangement or number gears employed will be modified to suit the particular operation which is to be performed on a workpiece.

The spindles have upper and lower bearings in the sleeves 31, 32 and 33, and, as all of these bearings are generally of the same construction, one reference numeral is utilized to identify these bearings, namely, the reference 34. This construction provides a very staple mounting of the spindles in the casing of the head, thus assuring alinement of the tools operated by the spindles, giving assurance to accuracy in the operation performed on the workpiece. It will be noted, for example, that the sleeves 32 and 33 provide bearing supports for the longer spindles at positions beyond the lower plate 14 of the head. In other words, the bearing support is at all times maintained in close proximity to the workpiece, or at least to the tools which are coupled with the tapered ends 22', 23' and 27' of the spindles. It will also be noted that thrust bearings are provided above and below the pinions 21, 26, these thrust bearings being indicated at 35 in Fig. 2 of the drawing.

In addition to the provision of the bearing sleeves or tubes, another distinctive feature of my head construction resides in the use of the intermediate bearing plate 15, which not only provides added bearing support for the spindles 22, 23 and 27, but also provides additional supports for the shaft 16 as well as the shaft 24 for the idler gear 25. From a consideration of Fig. 2 of the drawing, it will appear that the spindles have three bearing supports in the casing 10, and by virtue of this construction definite alinement of the spindles one with respect to the other is maintained during the operation of the head.

Having fully described my invention, what I claim as new and desire to secure by Letters Patent is:

1. A multiple tool operating head comprising a casing defined by top, bottom and intermediate plates, the intermediate plate forming a reinforcing and bearing plate, a drive shaft having a bearing support in the top and intermediate plates, a gear on the drive shaft between said top and intermediate plates, a plurality of spindles arranged circumferentially around said gear, said spindles having supports in all of said plates, pinions on said spindles engaging said gear for the drive of said spindles, another spindle similar to the first named spindles and supported in all of said plates, an idler shaft mounted in the top and intermediate plates, an idler gear on said shaft operatively engaging one of the spindle pinions, and a pinion on said last named spindle in the drive of said last named spindle.

2. A multiple tool operating head comprising a casing defined by top, bottom and intermediate plates, the intermediate plate forming a reinforcing and bearing plate, a drive shaft having a bearing support in the top and intermediate plates, a gear on the drive shaft between said top and intermediate plates, a plurality of spindles arranged circumferentially around said gear, said spindles having supports in all of said plates, pinions on said spindles engaging said gear for the drive of said spindles, another spindle similar to the first named spindles and supported in all of said plates, an idler shaft mounted in the top and intermediate plates, an idler gear on said shaft operatively engaging one of the spindle pinions, a pinion on said last named spindle in the drive of said last named spindle, all of said spindles having bearing sleeves mounted in the intermediate bearing plate and said bottom plate, and with bearings in opposed ends of said sleeves for support and guide of the spindles in said sleeves.

3. A multiple tool operating head comprising a casing defined by top, bottom and intermediate plates, the intermediate plate forming a reinforcing and bearing plate, a drive shaft having a bearing support in the top and intermediate plates, a gear on the drive shaft between said top and intermediate plates, a plurality of spindles arranged circumferentially around said gear, said spindles having supports in all of said plates, pinions on said spindles engaging said gear for the drive of said spindles, another spindle similar to the first named spindles and supported in all of said plates, an idler shaft mounted in the top and intermediate plates, an idler gear on said shaft operatively engaging one of the spindle pinions, a pinion on said last named spindle in the drive of said last named spindle, all of said spindles having bearing sleeves mounted in the intermediate bearing plate and said bottom plate, with bearings in opposed ends of said sleeves for support and guide of the spindles in said sleeves, and a predetermined number of said sleeves extending outwardly beyond the bottom plate.

4. A multiple tool operating head comprising a casing defined by top, bottom and intermediate plates, the intermediate plate forming a reinforcing and bearing plate, a drive shaft having a bearing support in the top and intermediate plates, a gear on the drive shaft between said top and intermediate plates, a plurality of spindles arranged circumferentially around said gear, said spindles having supports in all of said plates, pinions on said spindles engaging said gear for the drive of said spindles, another spindle similar to the first named spindles and supported in all of said plates, an idler shaft mounted in the top and intermediate plates, an idler gear on said shaft operatively engaging one of the spindle pinions, a pinion on said last named spindle in the drive of said last named spindle, all of said spindles having bearing sleeves mounted in the intermediate bearing plate and said botton plate, with bearings in opposed ends of said sleeves for support and guide of the spindles in said sleeves, a predetermined number of said sleeves extending outwardly beyond the bottom plate, and thrust bearings on the spindles above and below said pinions.

5. In multiple tool operating heads, a casing, a plurality of tool operating spindles in predetermined arrangement in said casing and protruding through one wall thereof, the casing being primarily defined by top and bottom plates, means for reinforcing all of the spindles within the casing between said plates, said means also forming a bearing support for a drive shaft, means for simultaneously actuating all of the spindles by a gear engagement between the drive shaft and said spindles located between the top plate and first named means, and said spindles having bearing sleeves in said bottom plate and first named means.

6. In multiple tool operating heads, a casing, a plurality of tool operating spindles in predetermined arrangement in said casing and protruding through one wall thereof, the casing being primarily defined by top and bottom plates, means for reinforcing all of the spindles within the casing between said plates, said means also forming a bearing support for a drive shaft, means for simultaneously actuating all of the spindles by a gear engagement between the drive shaft and said spindles located between the top plate and first named means, said spindles having bearing sleeves in said bottom plate and first named means, and said spindles having bearing supports in said top plate.

7. In multiple tool operating heads, a casing, a plurality of tool operating spindles in predetermined arrangement in said casing and protruding through one wall thereof, the casing being primarily defined by top and bottom plates, means for reinforcing all of the spindles within the casing between said plates, said means also forming a bearing support for a drive shaft, means for simultaneously actuating all of the spindles by a gear engagement between the drive shaft and said spindles located between the top plate and first named means, the gear engagement including pinions on each of said spindles, and thrust bearings on said spindles between said pinions, first named means and said top plate.

References Cited in the file of this patent

UNITED STATES PATENTS

| | | |
|---|---|---|
| 1,633,752 | Rackstraw | June 28, 1927 |
| 2,441,722 | Schultz | May 18, 1948 |
| 2,492,391 | Minek | Dec. 27, 1949 |